United States Patent [19]
Nishida

[11] Patent Number: 5,987,177
[45] Date of Patent: Nov. 16, 1999

[54] METHOD FOR COMPRESSING IMAGE SIGNAL AND METHOD FOR EXPANDING THE COMPRESSED IMAGE SIGNAL

[75] Inventor: Yukihiro Nishida, Fukuoka, Japan

[73] Assignee: Matsushita Electric Industrial Co., Ltd., Osaka, Japan

[21] Appl. No.: 08/834,797

[22] Filed: Apr. 3, 1997

[30] Foreign Application Priority Data

Apr. 9, 1996 [JP] Japan .................................. 8-086179

[51] Int. Cl.⁶ ...................................................... G06K 9/34
[52] U.S. Cl. ............................................................ 382/232
[58] Field of Search .................................... 382/232, 233, 382/236, 238, 250, 251, 254; 348/415, 457; 358/455, 456, 457, 433, 261.2, 462, 465, 466, 448, 454, 426, 432, 494, 504, 530

[56] References Cited

U.S. PATENT DOCUMENTS

| | | | |
|---|---|---|---|
| 3,997,912 | 12/1976 | Zsagar | 358/504 |
| 4,701,807 | 10/1987 | Ogino | 358/456 |
| 4,776,029 | 10/1988 | Shimura | 382/251 |
| 4,910,603 | 3/1990 | Hirahara et al. | 358/457 |
| 5,014,124 | 5/1991 | Fujisawa | 358/457 |
| 5,054,103 | 10/1991 | Yasuda et al. | 358/261.2 |
| 5,442,459 | 8/1995 | Gahang | 358/433 |

*Primary Examiner*—Jose L. Couso
*Attorney, Agent, or Firm*—Stevens, Davis, Miller & Mosher, L.L.P.

[57] ABSTRACT

Image compression and expansion with a high compression ratio includes encoding one block of data of an image, when data within the block are all equal, with a single representative value as gradation information and bit map data as resolution information representing that all the data within the block are equal. When there are variations in the data of the block and differences between the representative values in one block and those in an adjacent block are small, the difference values and flag bits, indicating that the gradation information represents the difference values, are used as the gradation information. When there are variations in the data of the block and differences between the representative values in the block and those in the adjacent block are large, absolute values of the representative values expressed in terms of bits smaller in number than the number of bits of the representative values and flag bits, indicating that the gradation information represents the absolute values, are used as the gradation information. Thus, coding compression of the image information is carried out with bit map data indicative of distribution of pixels of each group.

8 Claims, 22 Drawing Sheets

FIG.4
PRIOR ART
| 1 | 1 | 1 | 1 |
|---|---|---|---|
| 1 | 1 | 1 | 0 |
| 1 | 1 | 0 | 0 |
| 1 | 1 | 0 | 0 |
FIG.5A
PRIOR ART
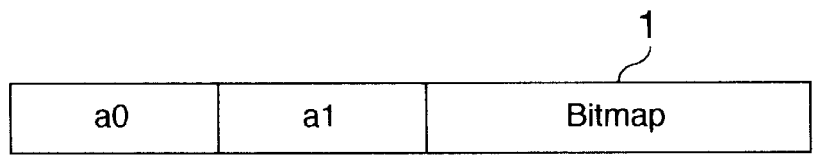
FIG.5B
PRIOR ART
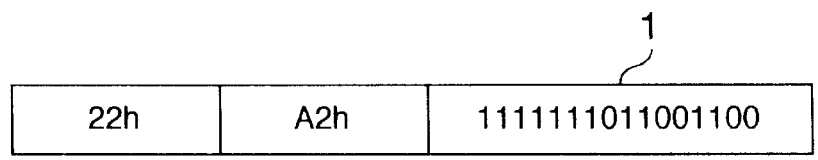
FIG.6
PRIOR ART
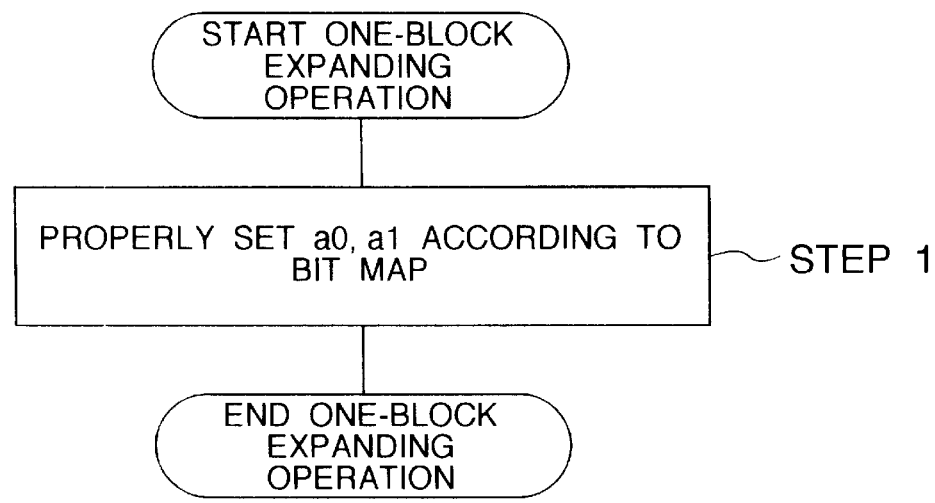

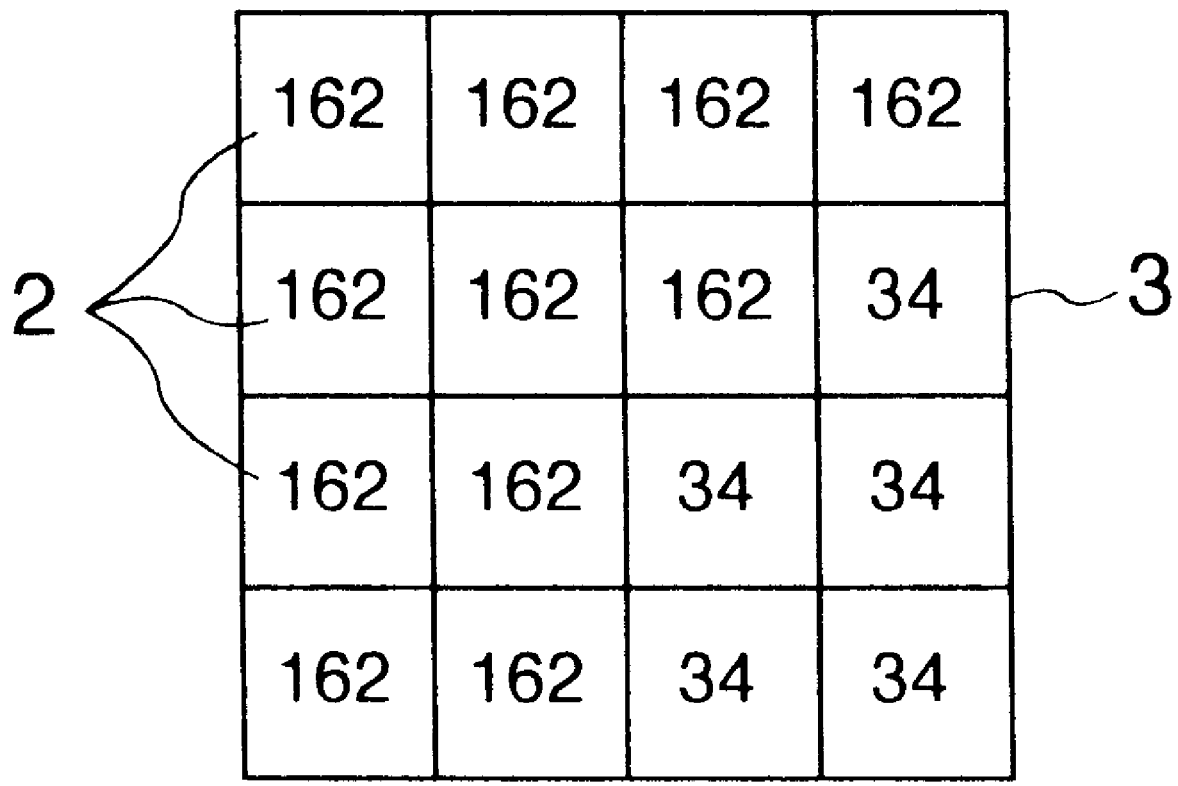

FIG.13A

| 200 | 200 | 200 | 200 |
|---|---|---|---|
| 200 | 200 | 200 | 200 |
| 200 | 200 | 200 | 200 |
| 200 | 200 | 200 | 200 |

| 200 | 184 | 170 | 150 |
|---|---|---|---|
| 200 | 178 | 148 | 54 |
| 180 | 170 | 74 | 54 |
| 178 | 178 | 56 | 52 |

| 150 | 148 | 145 | 31 |
|---|---|---|---|
| 36 | 35 | 31 | 34 |
| 38 | 32 | 27 | 22 |
| 36 | 30 | 25 | 20 |

| 200 | 200 | 200 | 200 |
|-----|-----|-----|-----|
| 200 | 200 | 200 | 200 |
| 200 | 200 | 200 | 200 |
| 200 | 200 | 200 | 200 |

| 176 | 176 | 176 | 176 |
|-----|-----|-----|-----|
| 176 | 176 | 176 | 64  |
| 176 | 176 | 64  | 64  |
| 176 | 176 | 64  | 64  |

| 152 | 152 | 152 | 32 |
|-----|-----|-----|----|
| 32  | 32  | 32  | 32 |
| 32  | 32  | 32  | 32 |
| 32  | 32  | 32  | 32 |

| 200 | 200 | 200 | 200 |
|-----|-----|-----|-----|
| 200 | 200 | 200 | 200 |
| 200 | 200 | 200 | 200 |
| 200 | 200 | 200 | 200 |

| 172 | 172 | 172 | 172 |
|-----|-----|-----|-----|
| 172 | 172 | 172 | 58 |
| 172 | 172 | 58 | 58 |
| 172 | 172 | 58 | 58 |

| 148 | 148 | 148 | 31 |
|-----|-----|-----|-----|
| 31 | 31 | 31 | 31 |
| 31 | 31 | 31 | 31 |
| 31 | 31 | 31 | 31 |

| 200 | 200 | 200 | 200 |
|-----|-----|-----|-----|
| 200 | 200 | 200 | 200 |
| 200 | 200 | 200 | 200 |
| 200 | 200 | 200 | 200 |

| 200 | 184 | 170 | 150 |
|-----|-----|-----|-----|
| 200 | 178 | 148 | 54  |
| 180 | 170 | 74  | 54  |
| 178 | 138 | 56  | 52  |

| 150 | 148 | 145 | 31 |
|-----|-----|-----|----|
| 36  | 35  | 31  | 34 |
| 38  | 32  | 27  | 22 |
| 36  | 30  | 25  | 20 |

~3

METHOD FOR COMPRESSING IMAGE SIGNAL AND METHOD FOR EXPANDING THE COMPRESSED IMAGE SIGNAL

BACKGROUND OF THE INVENTION

1. Field of the Invention

The present invention relates to methods for compressing and expanding multiple gradation image for use in a printer, a copying machine or the like.

2. Description of the Related Art

In recent years, office machines such as printers and copiers have become increasingly prevalent not only in various types of offices but also in personal use. Further, such apparatuses are required to be capable of handling a high quality of image or color image. The color image, in particular, which is enormous in its data quantity, has inevitably required an increased memory capacity and an associated disadvantageous price increase. Realization of a low price requires image data to be compressed while keeping its high quality so that the memory capacity necessary for storage of the image can be decreased.

Conventional methods for compressing information on a gradation image include a technique called block coding, which will be explained by referring to FIGS. 1 to 5.

FIG. 1 shows an enlargement of a part of an image. In FIG. 1, reference numeral 2 denotes a pixel which is a minimum unit of the image. It is assumed that one pixel 2 is represented by 8 bit data and handles 256 gradations having values of 0 to 255. A block 3 is a 4×4 array of adjacent pixels 2 (a total of 16 pixels), and processing is carried out on a block basis.

FIG. 2 shows an actual example of the block 3, and FIG. 3 shows a procedure of subjecting the block 3 to the block coding.

First of all, an average value of the values of the pixels in the block 3 to be subjected to the block coding is calculated, and the average value is used as an in-block average value m (step 1). The in-block average value m in the block 3 as shown in FIG. 2 is 122 when the values of the pixels are rounded off to the nearest integer.

Next, the in-block average value is compared with the values of the pixels in the block 3 so that the pixels having values less than the in-block average value are represented by "0", while the pixels not less than the in-block average value are represented by "1" to thereby form a pixel array pattern (step 2). The pixel array pattern corresponding to the block 3 of FIG. 2 is shown in FIG. 4.

An average value a0 of the values of the pixels belonging to a group of the pixel represented by "0" in the pixel array pattern as well as an average value a1 of the values of the pixels belonging to a group of the pixel represented by "1" therein are calculated to be used as block representative values respectively (step 3). In the case of the block 3 of FIG. 2, the block representative values a0 and a1 are 34 (22h) and 162 (A2h) respectively. A final block code 1 for the block 3 is made up of the two representative values, each consisting of 8 bit data, and a single pixel array pattern (bit map) of 16 bits as shown in FIG. 5A, which details are shown in FIG. 5B.

The expanding operation of restoring or reconstructing the block code 1 to actual image data will be explained in connection with FIG. 6. The block representative value a0 contained in the block code 1 of FIGS. 5A or 5B is applied to the pixels represented by "0" in the pixel array pattern; whereas the block representative value a1 contained in the block code 1 is applied to the pixels represented by "1" in the pixel array pattern. This operation is carried out for all the pixels of one block. An expanded image corresponding to the block code 1 of FIGS. 5A or 5B is shown in FIG. 7.

In general, when one pixel comprises q bits and the number of pixels in one block is denoted by N, the quantity of data in one block of an original image is (q×N) bits and the quantity of image data after subjecting the data to block coding is (2q+N) bits corresponding to a sum of the N bits of the pixel array pattern and (2×q) bits of block representative values. Accordingly, a compression ratio is qN/(2q+N), which becomes 4 in the case where the number q of bits of one pixel is 8 and the number of pixels of one block is 16 in the example of FIG. 5B.

When images are roughly separated into two types, the images are divided into such artificial images as made up of characters or graphics and such natural images as photographs or paintings. The artificial image includes a uniform portion in which most data have values equal to the values of in-block data. When the gradation varies, an amount of the variation is large. On the other hand, in the natural images, a variation in gradation between adjacent pixels always takes place but is small in most cases.

Meanwhile, in the prior art block coding, a compressed code for one block is represented always by two representative values and a single bit map, so that, even when the data in one block are all equal, that is, in the case of the artificial images, similar coding compression is carried out. Thus, even a block which can be sufficiently represented by a single representative value has two representative values, and even for an image having a small gradation variation the representative values are subjected to similar coding, which disadvantageously results in a law compression efficiency.

SUMMARY OF THE INVENTION

It is an object of the present invention to provide a method for compressing an image with a high compression ratio and a method for expanding the compressed image.

In accordance with a first aspect of the present invention, there is an image compression method by which, when all gradations within one block of image data are equal, a block code is generated which includes a single piece of gradation information and a pixel array pattern indicative of the fact that all the gradations are equal, and, when there are variations in the gradations of the block, two representative values in the block are taken and differences between the two representative values in the block and those in an adjacent block are taken, and a block code is generated which includes the gradation information obtained by encoding the differences in terms of bits smaller in number than those of the representative values when the differences are small and the gradation information obtained by encoding the representative values in terms of bits smaller in number than those of the representative values and also flag bits indicative of encoding either one of the differential values and the representative values. The block code is expanded to reconstruct the image when the differences are large.

In accordance with a second aspect of the present invention, a part of the data estimatable to restore at the time of expanding bit map data is deleted to increase the number of bits to be allocated to the gradation information, whereby the coding compression of the image information is carried out while keeping a gradation property.

With the above arrangement, since compression can be carried out according to the type of an image, the image data can be efficiently compressed and its compression ratio can be improved.

BRIEF DESCRIPTION OF THE DRAWINGS

FIG. 4 shows bit map data in the prior art image compression method;

FIGS. 5A and 5B show structures of a block code in the prior art image compression method;

FIG. 6 is a flowchart for explaining an expanding operation in a prior art image expansion method;

FIG. 7 shows image data after subjected to the expanding operation in the prior art image expansion method;

FIGS. 13A to 13C show image data before being subjected to the compressing operation in the image compression method in accordance with the first embodiment of the present invention;

FIGS. 15A to 15C show image data restored after being subjected to the expanding operation of the image expansion method of the first embodiment of the present invention;

FIGS. 16A to 16C show restored image data for comparison with FIGS. 15A to 15C;

FIGS. 24A to 24C show image data after being subjected to the compressing operation in the image compression method in accordance with the second embodiment of the present invention;

DESCRIPTION OF THE PREFERRED EMBODIMENTS

A first embodiment of the present invention will be explained with reference to FIGS. 1 and 8A to 16C.

Figures 1, 2:
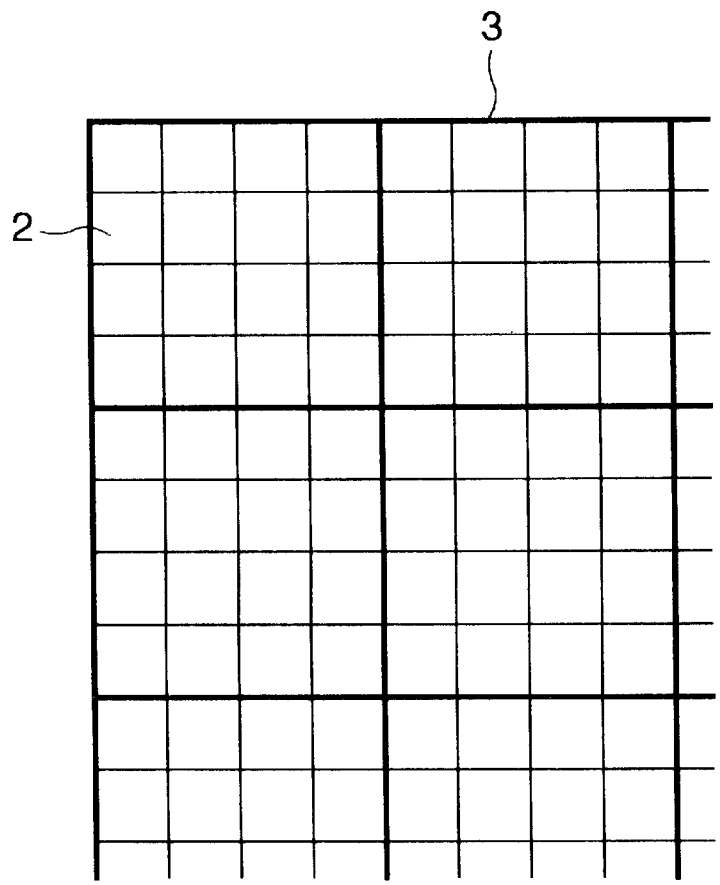
FIG. 1 shows blocks and a plurality of pixels contained in each block.
FIG. 2 shows an example of image data before subjected to a compressing operation.
Figure 3:
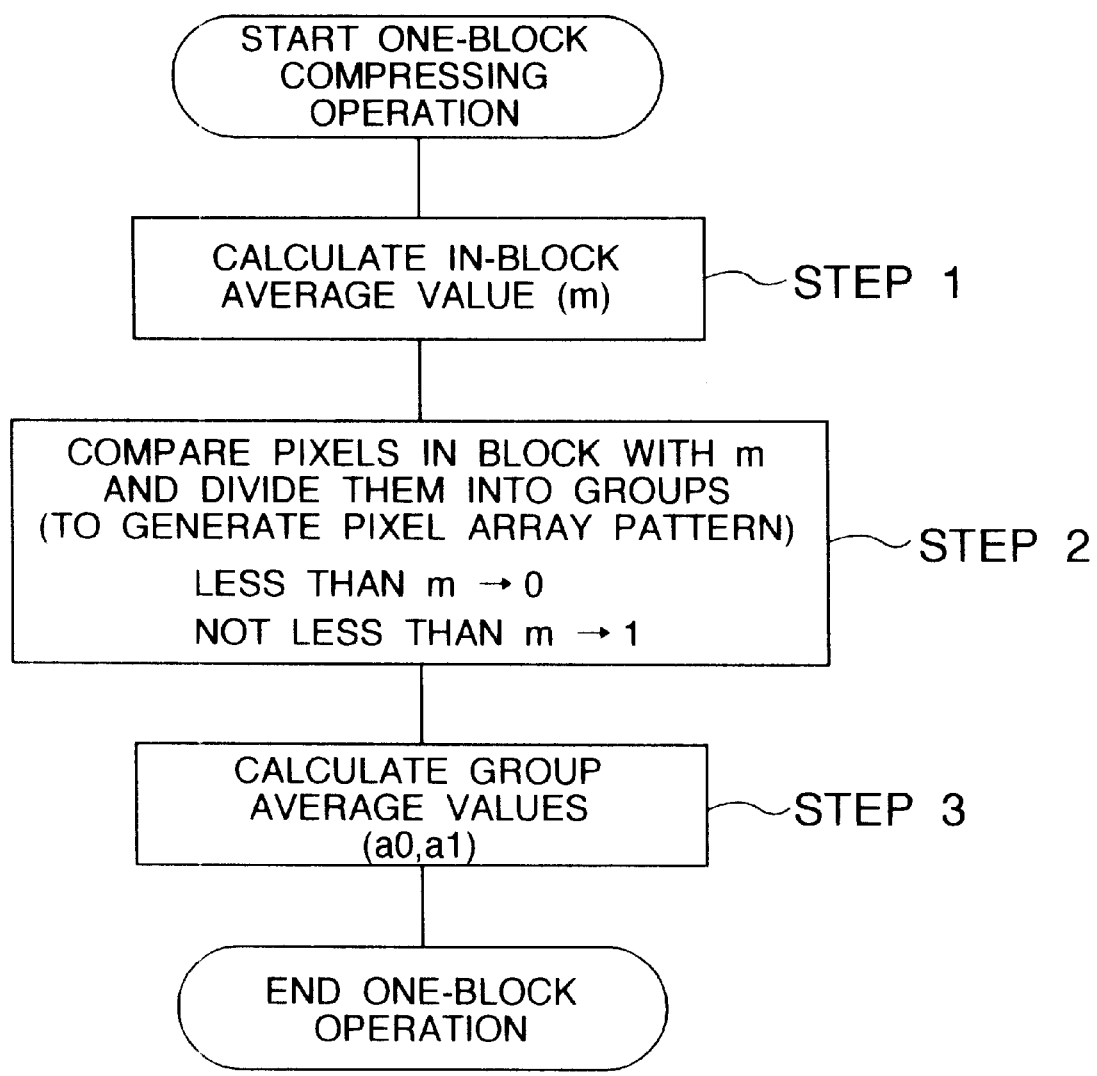
FIG. 3 is a flowchart for explaining the compressing operation in a prior art image compression method.

FIG. 1 is an enlargement of an original image in a first embodiment of the present invention. In FIG. 1, reference numeral 2 denotes a pixel which is a minimum unit of the image. It is assumed that each pixel is represented by 8 bit color data having 256 gradations with values of 0 to 255. As shown by the thick lines, a block 3 comprises a 4×4 array of adjacent pixels 2 (a total of 16).

It is assumed in the first embodiment that gradation data in a block code 1 based on the block coding is expressed by 3 sorts of data according to variations in the data of the block 3 and a difference in gradation variation from the adjacent pixel block 3. Explanation will next be made as to the code with use of FIGS. 8A to 9D.

Figure 8A:
FIGS. 8A and 8B show structures of a block code in an image compression method in accordance with a first embodiment of the present invention.

When all the data in one block are equal, a resultant block code 1 has a block average value m of 8 bits as gradation information and bit map data of 16 bits as resolution information, as shown in FIG. 8A. The then bit map data is 00h or FFh in hexadecimal notation (FFh in FIG. 8A), because all the data in the entire block are equal.

A block code 1 when data in one block has dispersion includes a group average value a0 of values of pixels belonging to a group having smaller values than the block average value m as the gradation information, a group average value a1 of values of pixels belonging to a group having larger values than the block average value, and bit map data of 16 bits indicative of arrangement of pixels of these groups. The absolute values of these group average values a0 and a1 are denoted by values a0* and a1* each of 43 bits, and differences d0 and d1 between the group average values in the block and those in the adjacent block are denoted by d0* and d1*. Flags each including one bit and indicative of whether the gradation information is the absolute value or difference data are allocated to the larger- and smaller-value groups respectively. The so formed block code 1 of 24 bits is shown in FIG. 8B.

Figure 8B:
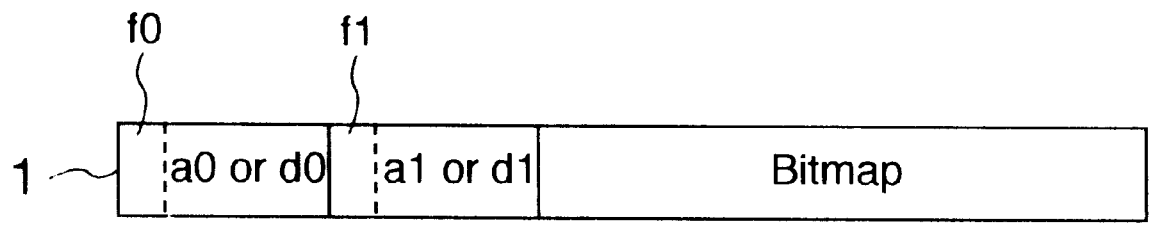

In FIG. 8B, reference symbol f0 denotes a flag relating to the smaller-value group, while symbol f1 denotes a flag relating to the larger-value group.

Since the gradation information of the smaller-value group and the gradation information of the larger-value group are set independently, the block code 1 has four different states, which are shown in FIGS. 9A through 9D.

Figure 9A:
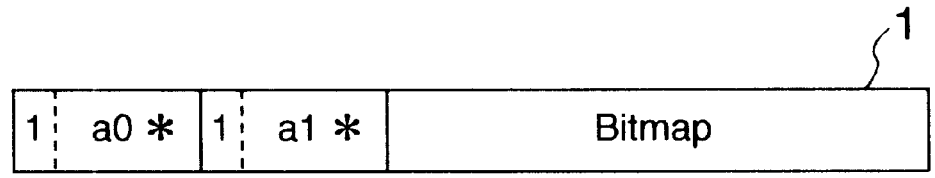
FIGS. 9A to 9D are structures of block codes in the image compression method in accordance with the first embodiment of the present invention.
Figure 9B:
Figure 9C:
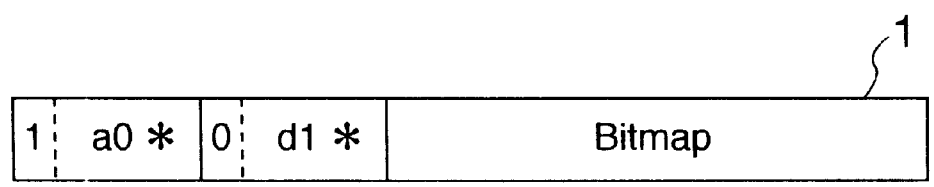
Figure 9D:
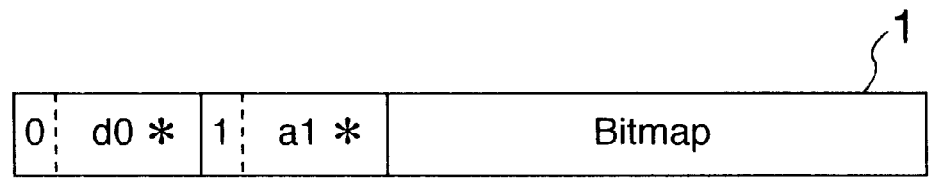

FIG. 9A shows the code when the differences between the larger- and smaller-value block average values in the block and those in the adjacent block are large, FIG. 9B shows the code when the differences between the larger- and smaller-value block average values in the block and those in the adjacent block are small, FIG. 9C shows the code when the difference between the smaller-value block average value in the block and that in the adjacent block is large while the difference between the larger-value block average value in the block and that in the adjacent block is small, and FIG. 9D shows the code when the difference between the smaller-value block average value in the block and that in the adjacent block is small while the difference between the larger-value block average value in the block and that in the adjacent block is large.

Figure 10A:
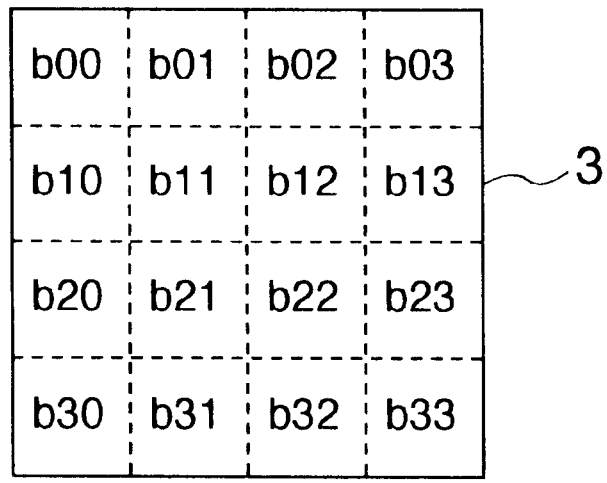
FIGS. 10A and 10B show bit map data in the image compression method in accordance with the first embodiment of the present invention.
Figure 10B:
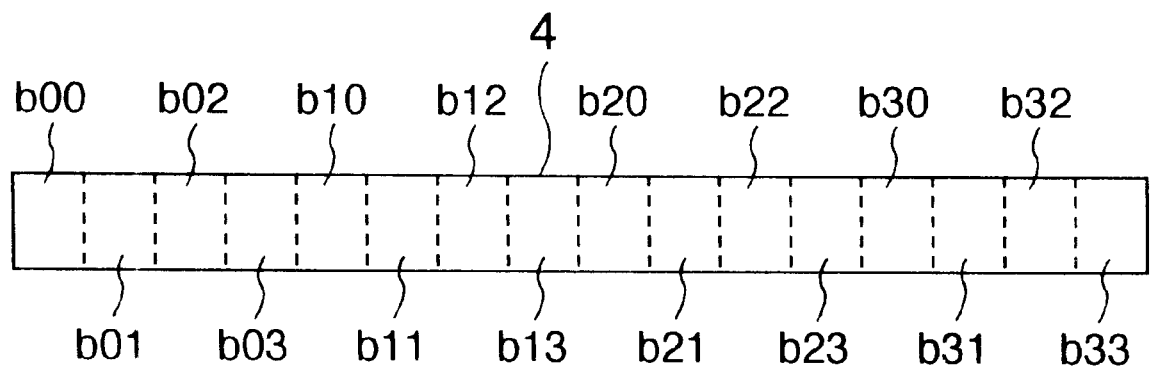

In this connection, the adjacent block refers to another block processed immediately before the target block by in the coding compressing operation and, when the processing is carried out from the left to right of the image, the adjacent block is positioned adjacently at the left side of the target block to be subjected to the coding compressing operation. In any case, the bit map comprises 16 bits, and a 1:1 relationship is satisfied between the pixels of the block 3 and the bits of the bit map data, in such a manner that the pixels b00 to b33 of the block 3 of FIG. 10A are arranged as shown by bit map data in FIG. 10B.

Figure 11:
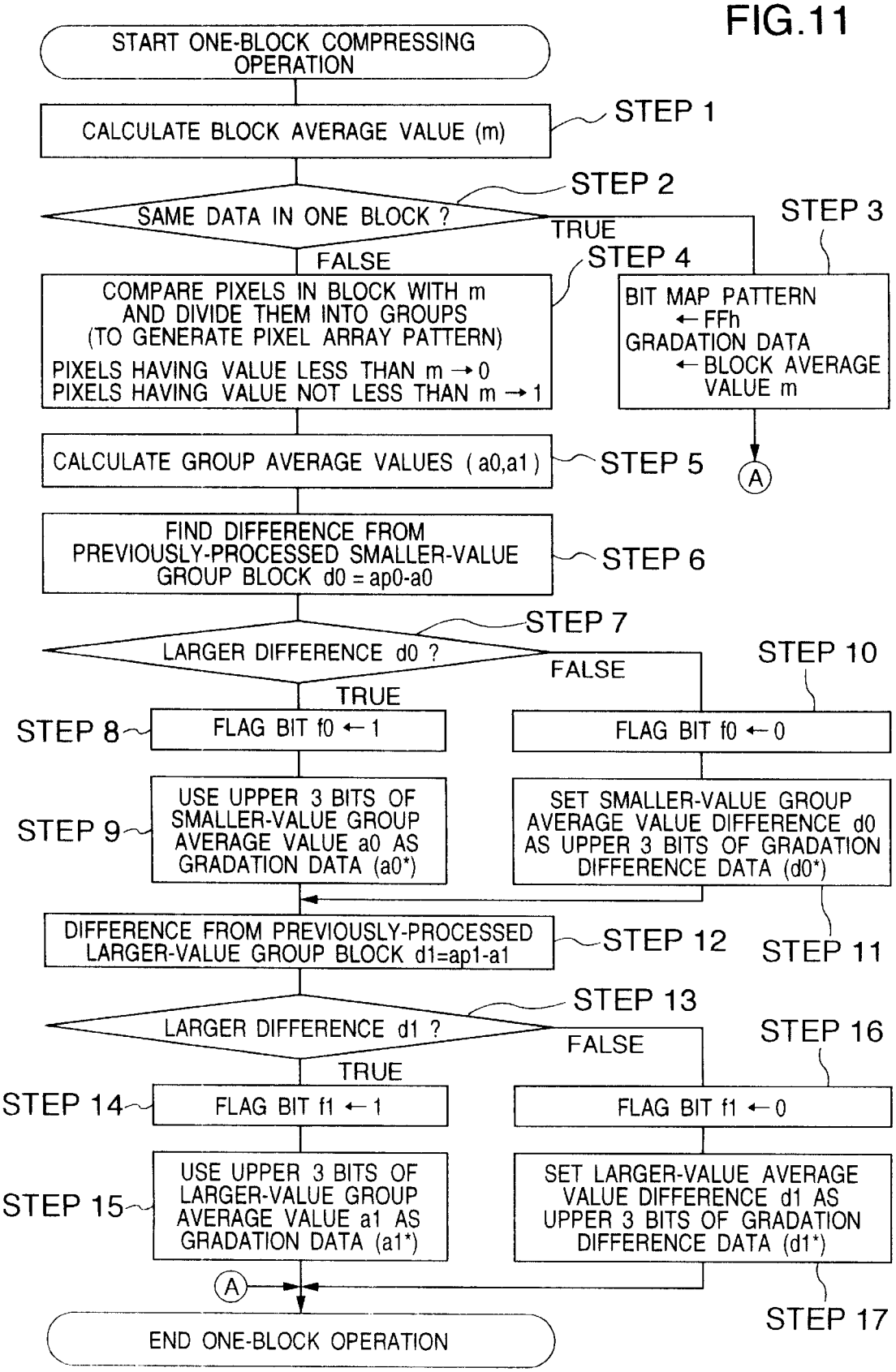
FIG. 11 is a flowchart for explaining a compressing operation in the image compression method in accordance with the first embodiment of the present invention.

Explanation will now be made as to a procedure when the block coding compressing operation of the present embodiment is carried out, in connection with FIG. 11. First of all, an average value of gradation data of all the pixels of the block 3 is found and is used as a block average value m (step 1).

At this time, when the data of one block are all equal, the operation is branched (step 2), FFh is set in the bit map pattern as data indicative of the fact that all the pixels are equal, the block average value m found in the step 1 is set as the gradation data (step 3), thus terminating the compressing operation of the block 3.

In the step 2, when there are variations in the data in one block, the respective pixels of the block 3 are compared with the block average value m so that the pixels are divided into a group having gradations less than the block average value m and a group having gradations not less than the block average value m, the pixels of the group having the gradations less than the block average value m are represented by "0", the pixels of the group having the gradation less than the block average value m are represented by "1", to thereby form a bit map pattern (step 4).

Next, average values of the gradations of the respective groups are found (step 5). In this case, the average value of the pixels of the group having the gradations less than the block average value m is set as a smaller-value group average value a0, while the average value of the pixels of the group having the gradations not less than the block average value m is set as a larger-value group average value a1. Suffixes "0" and "1" indicate the smaller- and larger-value groups respectively.

Then, a difference d0 between the smaller-value group average value a0 in the block 3 and that in the adjacent block is calculated (step 6). The adjacent block refers to a block which is previously processed and the smaller-value group average value of which is denoted with suffix "p". During the processing operation, the operation is branched depending on the magnitude of the difference d0 between the smaller-value group average value a0 of the block 3 and a smaller-value group average value ap0 of the previously-processed block (step 7).

When the smaller-value group difference d0 is large, for example, larger than a predetermined value, the flag f0 relating to the smaller-value group is set at "1" (step 8), and the upper 3 bits of the smaller-value group average value a0 are used as the smaller-value group gradation data a0* (step 9). In this case, the smaller-value group gradation data a0 corresponds to representation of the original smaller-value group average value a0 in terms of 3 bits and containing an error from the original value. For this reason, the data a0* is expressed with suffix "*".

In the step 7, when the smaller-value group difference d0 is small, for example, not larger than the predetermined value, the flag f0 relating to the smaller-value group is set at "0" (step 10), and the smaller-value group difference d0 is used as the smaller-value group gradation difference data d0* of 3 bits (step 11).

In this connection, the smaller-value group d0* corresponds to representation of the original smaller-value group average value d0 in terms of 3 bits and containing an error from the original value. For this reason, the smaller-value group d0* is expressed with suffix "*".

The larger-value group is then subjected to operations similar to the operations of the smaller-value group carried out in the steps 6 to 11. That is, the difference d1 between the larger-value group average value a1 in the block 3 and the larger-value group average value p1 in the adjacent block is calculated (step 12). During the processing operation, the operation is branched depending on the magnitude of the difference d1 between the larger-value group average value a1 in the block 3 and the larger-value group average value p1 in the adjacent block (step 13).

When the larger-value group difference d1 is large, for example, larger than a predetermined value, the flag f1 relating to the larger-value group is set at "1" (step 14), and upper 3 bits of the larger-value group average value a1 are used as the larger-value group gradation data a1* (step 15).

In the step 13, when the larger-value group difference d1 is small, for example, not larger than the predetermined value, the flag f1 relating to the larger-value group is set at "0" (step 16), and the larger-value group difference d1 is used as the larger-value group gradation difference data d1* (step 17). In this conjunction, the suffix "*" indicates that the original larger-value group average value a1 or the larger-value group difference d1 expressed in terms of 3 bits contains an error from the original value. For this reason, the suffix "*" is added thereto.

Through the above operations, the gradation information of larger- and smaller-value groups in the target block 3 and the bit map data are prepared, whereby generation of the block code 1 is completed and the compressing operation of one block is terminated.

Figure 12:
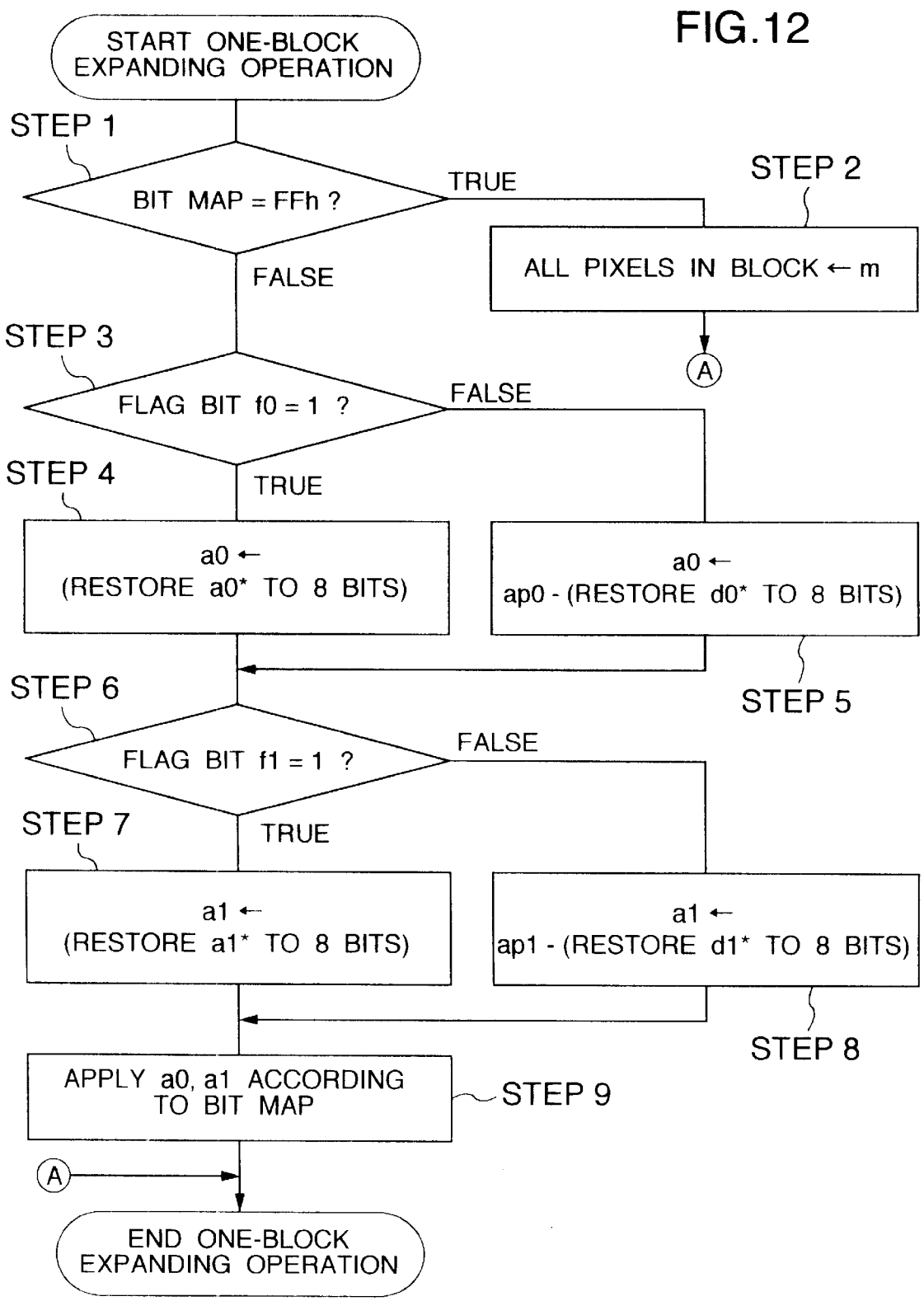
FIG. 12 is a flowchart for explaining an expanding operation in an image expansion method in accordance with a first embodiment of the present invention.

Explanation will next be made as to a method for expanding the block code 1 in accordance with an embodiment of the present invention, by referring to FIG. 12.

First of all, the operation is branched depending on whether or not the bit map data in the block code 1 is FFh (step 1).

When the bit map data is FFh, the system judges that all the pixels in the target block 3 have an identical value, and the block average value m given as the gradation information in the block code 1 is set for all the pixels of the block 3, and terminates the operation (step 2).

When the bit map data is not FFh, the system judges that the target block 3 has larger- and smaller-value groups and the gradation information in the block code 1 indicates the group average values in the groups or a group difference therebetween. First, the operation is branched depending on whether or not the flag f0 relating to the smaller-value group is "1" (step 3). When the smaller-value group flag bit f0 is "1", the gradation information of the smaller-value group indicates the smaller-value group average value a0*, whereby a restoration of the smaller-value group average value a0* to 8-bit data is set as the smaller-value group gradation (step 4).

When the smaller-value group flag bit f0 is "0", the smaller-value group gradation information indicates the smaller-value group differential value d0*, for which reason a value obtained by adding a restoration of the differential value d0* to 8-bit data to the smaller-value group gradation of the previous block is set as the smaller-value group gradation (step 5).

Subsequently, operations similar to those carried out in the steps 3 to 5 are applied even to the larger-value group gradation information. The operation is branched depending on whether or not the larger-value group flag bit f1 relating to the larger-value group is "1" (step 6). When the larger-value group flag bit f1 is "1", the larger-value group gradation information indicates the larger-value group average value a1*, for which reason a restoration of the larger-value group average value a1* to 8-bit data is set as the larger value group gradation (step 7).

When larger-value group flag bit f1 is "0", the larger-value group gradation information indicates the larger-value group differential value d1*, a value obtained by adding a restoration of the differential value d1* to 8-bit data to the larger-value group gradation of the previous block is set as the larger-value group gradation (step 8).

Finally, the gradation of the respective groups are arranged according to the bit map. The smaller-value group gradation is applied to the pixels represented by "0" in the bit map, while larger-value group gradation is applied to the pixels represented by "1" in the bit map (step 9). Through the above operations, the expanding operation of the block code 1 corresponding to one block is completed.

Explanation will now be made in connection with a case where the coding compression in accordance with the first embodiment of the present invention is applied to an actual image, by referring to FIGS. 13A to 16C. FIGS. 13A to 13C show enlargements of the adjacent blocks in an original image, in which one cell in the blocks corresponds to one pixel. One pixel is represented by 8 bit data and has 256 gradations having values of 0 to 255. A 4×4 pixel array forms one block. FIGS. 13A to 13C show three adjacent blocks respectively. The coding compressing and expanding operations are carried out from left to right in the order of FIGS. 13A, 13B and 13C.

Figure 14A:
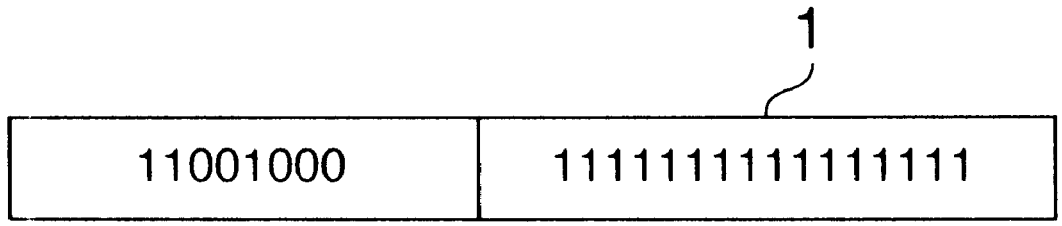
FIGS. 14A to 14C are structures of block codes in the image compression method in accordance with the first embodiment of the present invention.
Figure 14B:
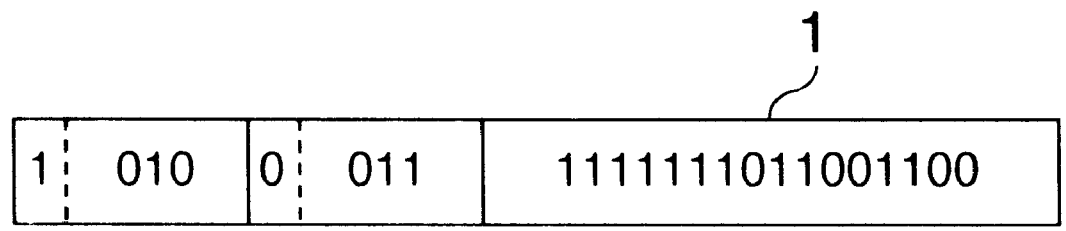
Figure 14C:
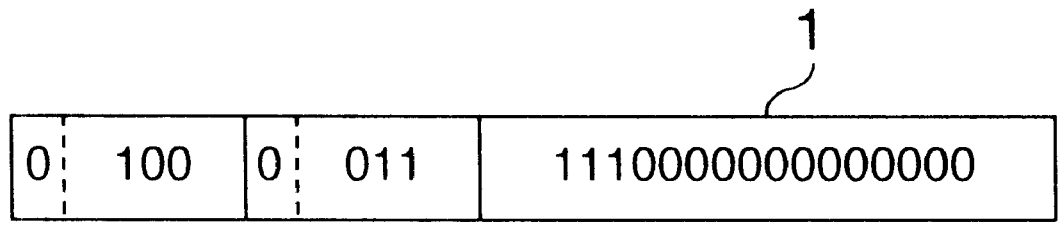

Block codes 1 after these blocks are subjected to the coding compression are shown in FIGS. 14A to 14C. The block codes 1 of FIGS. 14A to 14C correspond to FIGS. 13A to 13C, respectively. FIG. 14A shows the block code 1 when all the pixels have an identical value, FIG. 14B shows the code when absolute value data is used for the smaller-value group and differential data is used for the larger-value group, and FIG. 14C shows the code when the differential data is used for the smaller-value group and the absolute value data is used for the larger-value group.

FIGS. 15A to 15C show images obtained after the block codes 1 of FIGS. 14A to 14C are expanded respectively. FIGS. 16A to 16C show restored image data for comparison with FIGS. 15A to 15C respectively.

In the coding compression of the first embodiment, in general, when one pixel is represented by q-bit data and the number of pixels in one block is N, the quantity of data in one block of the original image is (q×N) bits and image data after being subjected to the block coding comprises (q+N) bits corresponding to a sum of N bits of pixel array pattern and q bits of gradation information (including the flags).

Accordingly, a compression ratio of the image data based on the block coding of the present invention is qN/(q+N). When the number q of bits of one pixel is 8 and the number of pixels of one block is 16, the compression ratio is 5.3.

Explanation will next be made as to a second embodiment of the present invention with use of FIGS. 17A to 26C. In the first embodiment, the larger- and smaller-value group flag bits have been allocated to the gradation information field, while actual gradation data, i.e., absolute value data or differential data has been expressed in terms of 3 bits respectively. When the 3-bit absolute value data or differential data is used to express the 8-bit original data, its expression range is narrow, and there occurs a so-called "gradation jump" in which the gradation abruptly changes, which results in an inevitable deterioration in image quality for some images to be processed.

In the second embodiment, in order to avoid the above problem, 2 bits in the bit map data are deleted and the deleted 2 bits are allocated to the flag bits of the larger- and smaller-value groups, so that a 4-bit expression range is allocated to the absolute value data or differential data of the larger- and smaller-value groups respectively, thus broadening the gradation expression range. The 2 bits deleted in the bit map are estimated and restored at the time of the expanding operation.

In the second embodiment, as in the first embodiment, gradation data in the block code 1 based on the block coding is expressed in terms of three sorts of data depending on variations of the data in the block 3 and on a difference in gradation change from the adjacent pixel block. Such codes will be explained in connection with FIGS. 17A to 18D.

Figure 17A:
FIGS. 17A and 17B are structures of block codes in an image compression method in accordance with a second embodiment of the present invention.

When all the pixels in one block have an identical value, as in the first embodiment, a resultant code has a block average value m of 8 bits as the gradation information and bit map data of 16 bits as the resolution information, and is expressed as shown in FIG. 17A. The then bit map data is 00h or FFh in hexadecimal notation, because all the data of the entire block 3 are equal.

When there are variations in the data in one block, a resultant code has a group average value a0 of values of the pixels in a group having smaller values than the block average value m as the gradation information, a group average value a1 of values of the pixels in a group having larger values than the block average value m, and bit map data of 14 bits indicative of arrangement of pixels in these groups. In this connection, the absolute values of these group average values a0 and a1 are represented by values a0 and a1 each of 4-bit data, differences d0 and d1 from the group average values of the adjacent block are represented by values d0 and d1 each of 4 bit data, and a flag of one bit indicative of whether the gradation data is the absolute value data or the differential data is allocated to each of the larger- and smaller-value groups.

Figure 17B:
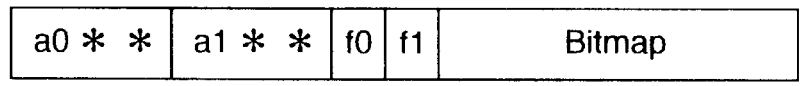
Figure 18A:
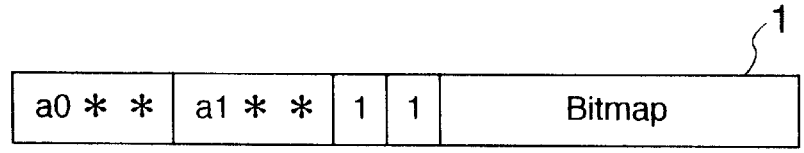
FIGS. 18A to 18D are structures of block codes in the image compression method in accordance with the second embodiment of the present invention.
Figure 18B:
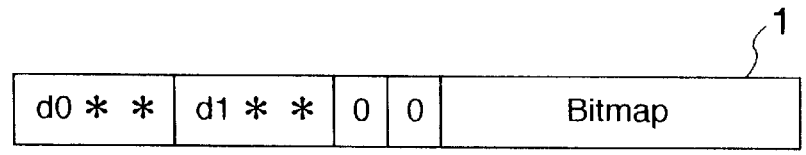
Figure 18C:
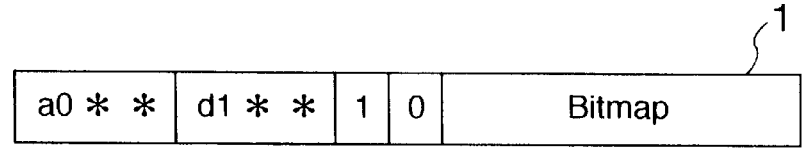

FIG. 17B shows a block code 1 when there are variations in the data of one block, in which reference symbol f0 indicates a flag relating to the smaller-value group and symbol f1 indicates a flag relating to the larger-value group. Since the smaller-value group gradation information and larger-value group gradation information are set independently, the block code 1 has 4 different states, which are shown in FIGS. 18A to 18D. FIG. 18A shows the code when differences between both the larger- and smaller-value block average values in the block and those in the adjacent block are large, FIG. 18B shows the code when differences between both the larger- and smaller-value group average values in the block and the adjacent block are small, FIG.

Figure 18D:
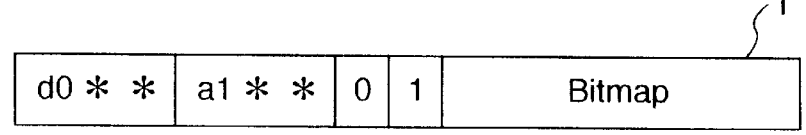

18C shows the code when the difference between the smaller-value block average value in the block and that in the adjacent block is large and the difference between the larger-value block average value in the block and that in the adjacent block is small, and FIG. 18D shows the code when the difference between the smaller-value block average value in the block and that in the adjacent block is small and the difference between the larger-value block average value in the block and that in the adjacent block is large.

In this connection, the adjacent block in the coding compression refers to another block processed immediately before the target block 3 when the processing is carried out from left to right of the image, which corresponds to a block located at the left side of the block 3 to be subjected to the coding compression.

Figure 19A:
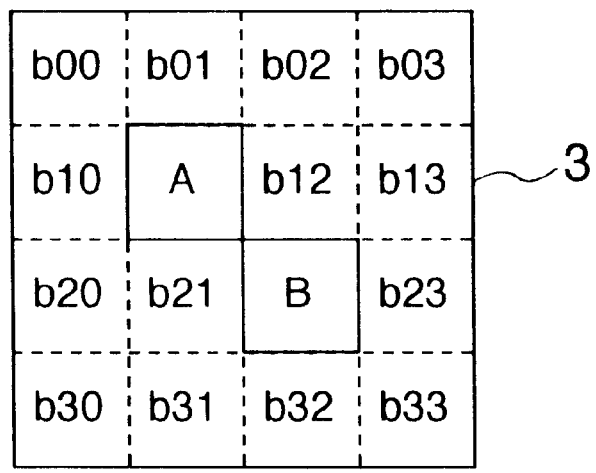
FIGS. 19A and 19B show bit map data in the image compression method in accordance with the second embodiment of the present invention.
Figure 19B:
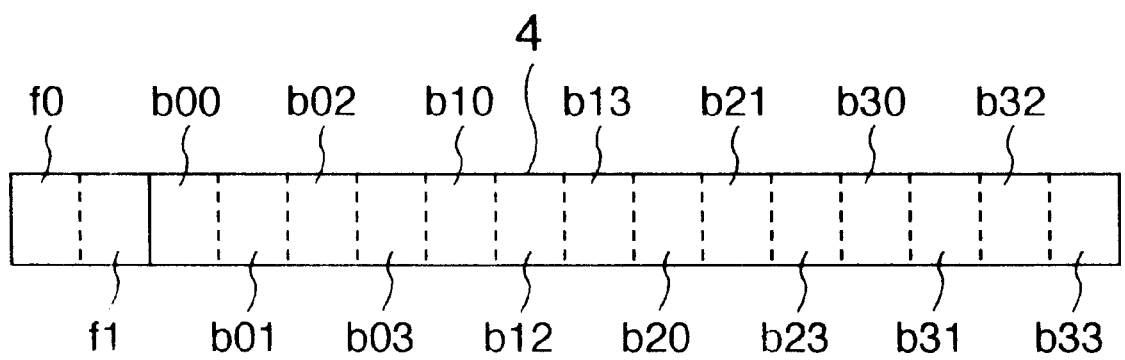

A bit map when all the data in one block are equal has the same structure as the bit map of 16 bits explained in the first embodiment. However, when there are variations in the data of one block, such a bit map having the interior bits of the block 3 except for 2 pixels A and B as shown in FIG. 19A is used, so that the pixels of the block 3 are associated with the bits in the bit map data as shown in FIG. 19B and the flags f0 and f1 are allocated to the idle 2 bits.

Figure 20:
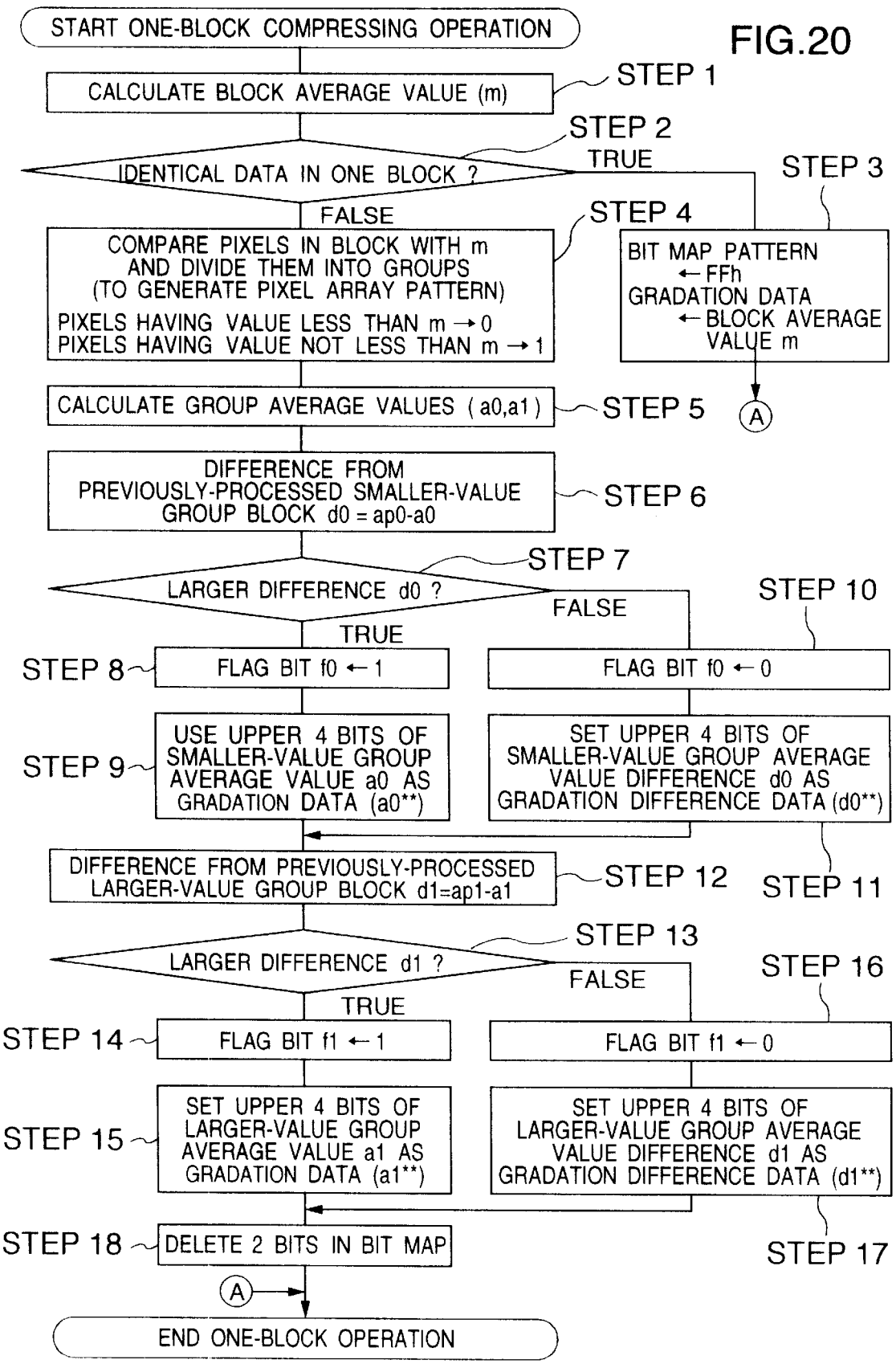
FIG. 20 is a flowchart for explaining the compressing operation in the image compression method in accordance with the second embodiment of the present invention.

FIG. 20 shows a procedure when a single block 3 is subjected to the block coding compression in accordance with the second embodiment of the present invention.

Larger and smaller-value group gradation data a0 and a1 and differential data d0 and d1 in steps 1 to 17 are the same as those in the steps 1 to 17 of the block compressing operation explained in the first embodiment except that these data correspond to representations of the group average values a0 and a1 and differential values d0 and d1 respectively in terms of 4 bits; thus, detailed explanation thereof is omitted.

In this connection, the gradation data a0 and a1 and the differential data d0 and d1, which correspond to representations of the group average values a0 and a1 and the differential values d0 and d1 respectively in terms of 4 bits, are expressed as attached by suffix "**", since these data contain errors from the original value and are different from the gradation data a0* and a1* and differential data d0* and d1* of 3 bits used in the first embodiment.

When a series of operations of the steps 1 to 17 are completed, 2 bits in the bit map are deleted to reduce the bit map data of 16 bits to bit map data of 14 bits (step 18). The bits to be deleted are assumed to be the two bits corresponding to the two pixels A and B located at fixed positions within the block 3. Through the foregoing operations, the larger- and smaller-value group gradation information and bit map data of the block 3 are generated, at which stage the generation of the block code 1 is completed and the compressing operation of one block is terminated.

Figure 21:
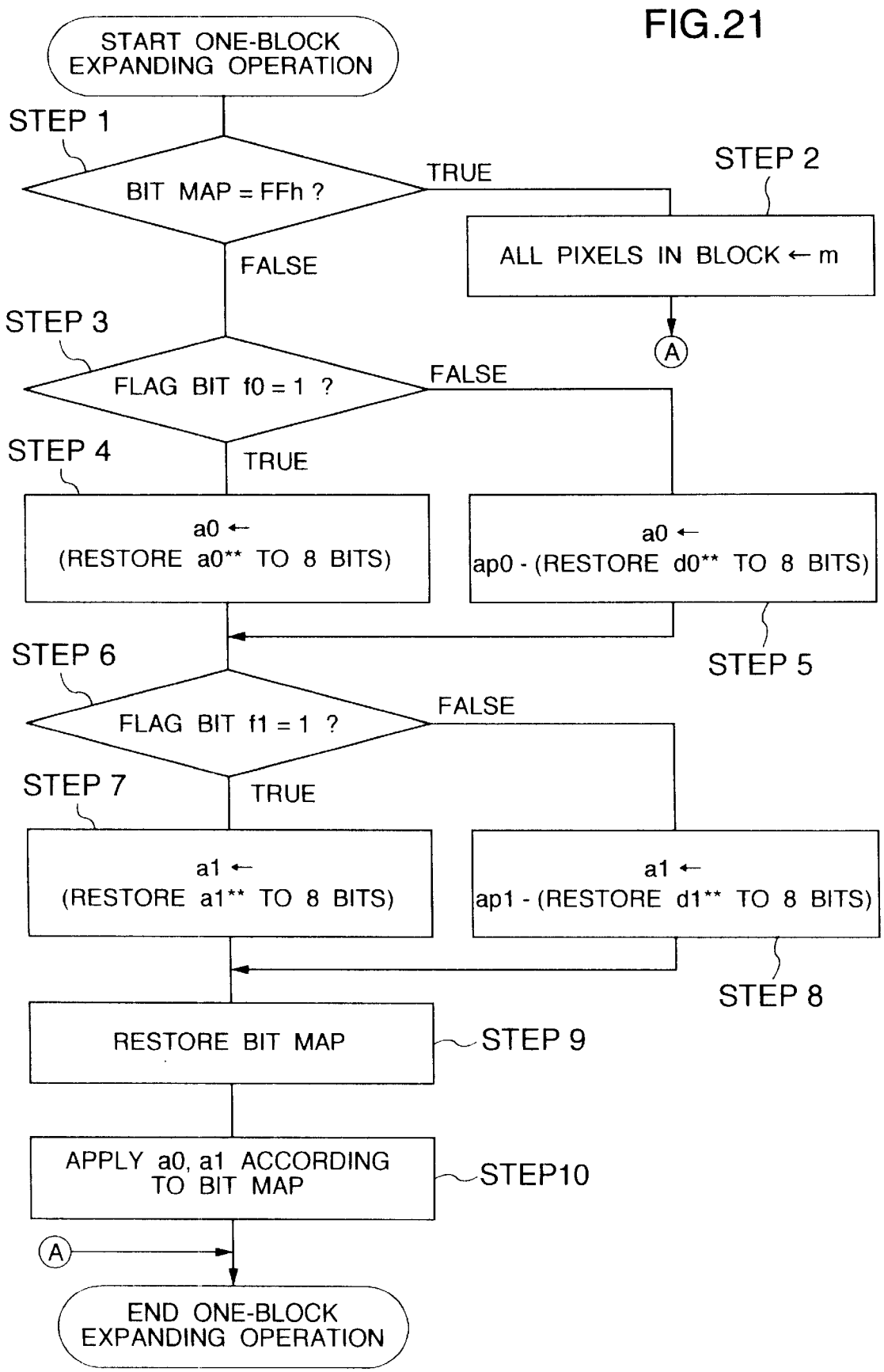
FIG. 21 is a flowchart for explaining an expanding operation in an image expansion method in accordance with a second embodiment of the present invention.

Explanation will next be made as to a method for expanding the block code 1 in accordance with the second embodiment with use of FIG. 21.

Larger and smaller-value group gradation data a0 and a1 and differential data d0 and d1 in steps 1 to 8 are the same as those in the steps 1 to 8 of the block compressing operation explained in the first embodiment, except that these data correspond to representations of the group average values a0 and a1 and differential values d0 and d1 respectively in terms of 4 bits; thus detailed explanation thereof is omitted.

When a series of expanding operations of the steps 1 to 8 is completed, 2 bits in the deleted bit map are estimated to restore the bit map (step 10). Finally, as in the first embodiment, the smaller-value group gradation is applied to the pixels of the bit map represented by "0", while the larger-value group gradation is applied to the pixels of the bit map represented by "1" (step 9), at which stage the expanding operation of the block code 1 corresponding to one block is completed.

Explanation will now be made as to how to estimate the bit map by referring to FIGS. 22A to 23B.

Figure 22A:
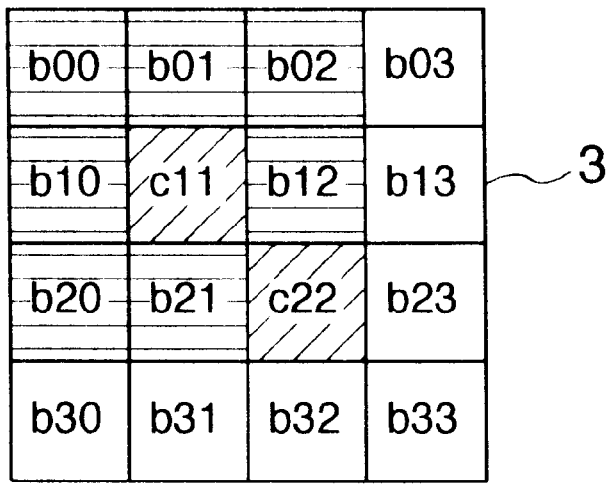
FIGS. 22A and 22B are diagrams for explaining estimation of the bit map in the image expansion method in accordance with the second embodiment of the present invention.
Figure 22B:
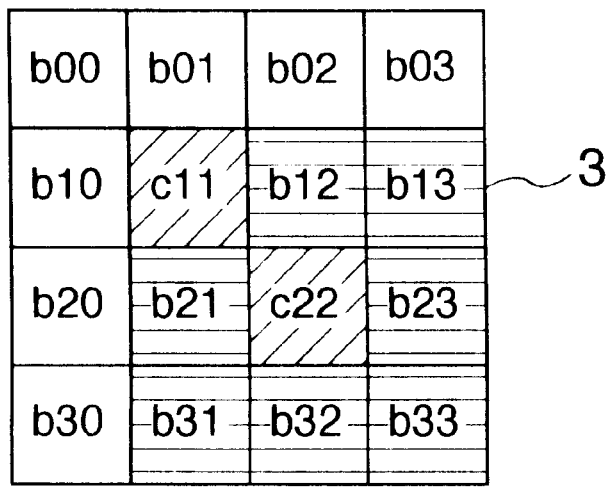

FIGS. 22A and 22B show bit maps in the form of images of the blocks 3, in which pixels b00, b01, . . . are defined by the bit maps and pixels c11 and c22 are pixels which are required to be estimated in the expanding operation, because they are deleted in the coding operation. FIG. 22A is provided for explanation of estimation of the bit map as to the pixel c11, while FIG. 22B is provided for explanation of estimation of the bit map as to pixel c22.

In the estimation of the bit map of the pixel c11, with use of its peripheral pixels b00, b01, b02, b10, b12, b20 and b21, the bits of the pixel c11 are determined by a majority decision of the bits "1" and "0" of these pixels.

Figure 23A:
FIGS. 23A and 23B show an example of estimation of the bit map in the image expansion method in accordance with the second embodiment of the present invention.
Figure 23B:
Figure 25A:
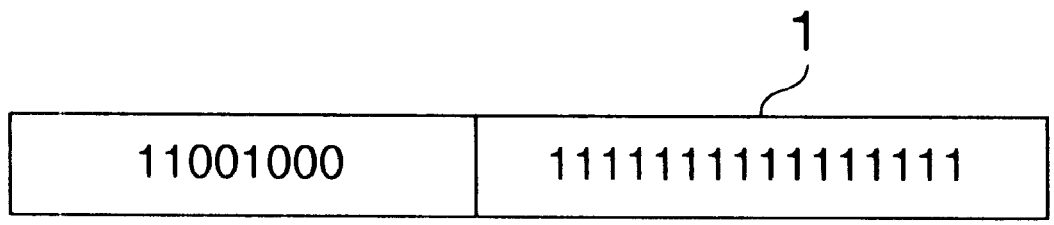
FIGS. 25A to 25C are structures of block codes in the image compression method in accordance with the second embodiment of the present invention.
Figure 25B:
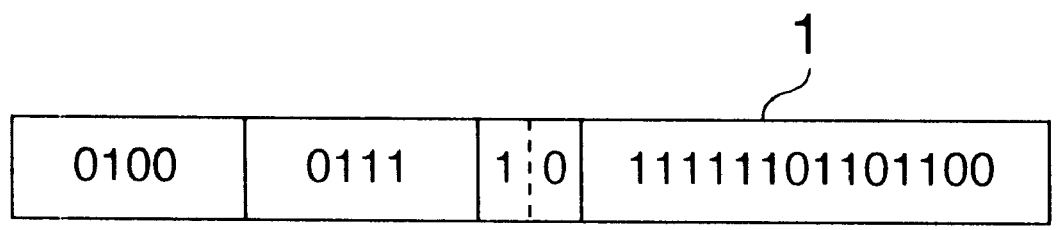
Figure 25C:
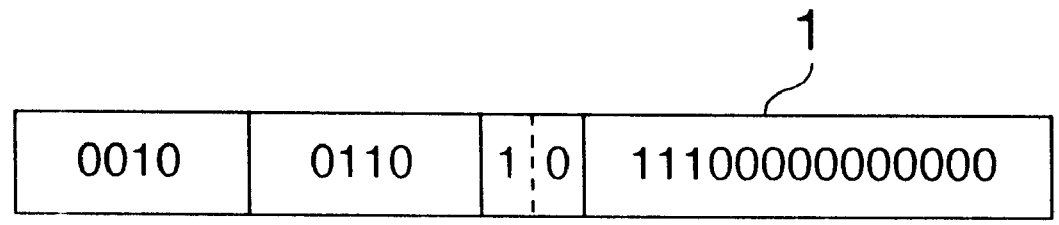

Similarly, in FIG. 22B, the estimation of the bit map of the pixel c22 is explained, in which case the pixel c22 is estimated by the majority decision with use of its peripheral pixels b12, b13, b21, b23, b31, b32 and b33. FIGS. 23A and 23B show examples when bit map estimation was actually carried out. FIG. 23A shows bit map data prior to the estimation in the form of an image in the block 3, in which pixels A and B are to be estimated.

A result of the estimation is shown in FIG. 23B. Since bits in the bit map are based on the data distribution when divided based on the reference block average value m, it is considered that most of the same value pixels are present as mutually gathered. Accordingly, according to the present method for performing estimation based on the number of the peripheral pixels arranged around a pixel to be estimated, substantially accurate estimation can be realized.

Figure 26A:
FIGS. 26A to 26C show image data restored after being subjected to the expanding operation in the image expansion method in accordance with the second embodiment of the present invention.
Figure 26B:
Figure 26C:

Shown in FIGS. 24A to 26C are examples when the coding compression of the first embodiment is applied to actual images. FIGS. 24A to 24C are enlargements of parts of an original image. FIGS. 25A to 25C are block codes when the blocks 3 of FIG. 24A to 24C are subjected to the coding compression of the second embodiment of the present invention. FIGS. 25A to 25C show the block codes corresponding to FIGS. 24A to 24C. More specifically, FIG. 25A shows the block code 1 when all the pixels have an identical value, FIG. 25B shows the code when the absolute value data is used for the smaller-value group and the differential data is used for the larger-value group, and FIG. 25C shows the code when the differential data is used for the smaller-value group and the absolute value data is used for the larger-value group. FIGS. 26A to 26C show images obtained after the block codes of FIGS. 25A to 25C are expanded, respectively.

In the coding compression of the second embodiment, when one pixel comprises q-bit data and the number of pixels in one block is denoted by N, in general, the quantity of data in one block of an original image is (q×N) bits and the quantity of image data after being subjected to the block coding is {q+(N−2)+2} bits corresponding to a sum of (N−2) bits of pixel array pattern, q bits of gradation information and 2 bits of flags. Accordingly, a compression ratio of this block encoding is qN/(q+N), which becomes 5.3 when the number q of bits of one pixel is 8 and the number of pixels in one block is 16.

As has been explained in the foregoing, in accordance with the first embodiment of the present invention, one block of an image is expressed in terms of a single representative value and bit map data indicative thereof when all the data within the block are equal, the block is expressed in terms of two representative values and bit map data indicative thereof when there are variations in the data of the block, and when differences between the representative values and the representative values of the adjacent block are small, the differences are expressed as symbols of the representative values, whereby a compression ratio can be improved.

In accordance with the second embodiment, data in the bit map is deleted at the time of the coding compression and a bit map is estimated at the time of the expanding operation, so that the number of bits necessary for expressing the group average values and/or group differential values can be increased, thereby improving a compression ratio while keeping a gradation property.

I claim:

1. A method of compressing a multiple gradation image by generating a block code including gradation information in a block having a plurality of pixels of the multiple gradation image and a pixel array pattern of said gradation information to reduce a quantity of image information, said method comprising:

(a) generating, when said plurality of pixels in said block have the same gradation, a block code which includes a single piece of gradation information and a pixel array pattern which indicates that said plurality of pixels in said block have the same gradation; and (b) obtaining, when said plurality of pixels in said block have different gradations, a plurality of representative values in said block and a plurality of difference values between the plurality of representative values in said block and the plurality of representative values in an adjacent block respectively and then generating a block code including (i) gradation information obtained by encoding said plurality of difference values in terms of bits which are smaller in number than those of said plurality of representative values in a case where said plurality of difference values are small, (ii) gradation information obtained by encoding said plurality of representative values in terms of bits which are smaller in number than those of said representative values in a case where said plurality of difference values are large, (iii) flag bits indicating whether said plurality of difference values or said plurality of representative values are encoded and (iv) a pixel array pattern which indicates position information of each of said plurality of pixels of said block.

2. A method according to claim 1, wherein in step (a), said single piece of gradation information has a number of bits equal to those of said representative values.

3. A method according to claim 1, wherein a number of bits in said pixel array pattern is less, by a number greater than or equal to two, than a number of pixels in said block and a number of bits allocated to said gradation information is increased by a number of bits equal to said number greater than or equal to two.

4. A method of expanding the block code generated by the method according to claim 1 to reconstruct data of said block in the image having multiple gradation, said method comprising the steps of:

(a) reconstructing data of said block from said single piece of gradation information when said pixel array pattern indicates that said plurality of pixels in said block have the same gradation;

(b) reproducing said plurality of representative values for said block from said generation information for said block when said flag bits indicate that said plurality of representative values are encoded;

(c) reproducing said plurality of representative values for said block on the basis of said plurality of difference values for said block and said plurality of representative values for said adjacent block when said flag bits indicate that said plurality of difference values are encoded; and (d) distributing said plurality of representative values for said block in accordance with the pixel array pattern for said block.

5. A method of compressing an image having multiple gradations to reduce a quantity of image information for a plurality of pixels forming a block in the image, said method comprising:

(a) dividing said plurality of pixels included in said block into a plurality of groups in accordance with a gradation of each of said plurality of pixels when said plurality of pixels in said block have different gradations;

(b) generating a block code including, when said plurality of pixels in said block have different gradations, (i) gradation information including a selected one of a representative value for each of said plurality of groups in said block and a difference value between the representative value in said block and the representative value in an adjacent block; and (c) expanding said block code generated in step (b) to reconstruct data of said block in the image having multiple gradations, wherein:

a number of bits in said pixel array pattern is less, by a number greater than or equal to two, than a number of pixels in said block and a number of bits allocated to said gradation information is increased by a number of bits equal to said number greater than or equal to two and said method further comprises the step of estimating gradation information for pixels in said block corresponding to said number of bits greater than or equal to two to reconstruct data of said plurality of pixels of said block in the image having multiple gradations.

6. A method according to claim 4, wherein a number of bits in said pixel array pattern is less, by a number greater than or equal to two, than a number of pixels in said block and a number of bits allocated to said gradation information is increased by a number of bits equal to said number greater than or equal to two and said method further comprises the step of estimating gradation information for pixels in said block corresponding to said number of bits greater than or equal to two to reconstruct data of said plurality of pixels of said block in the image having multiple gradation.

7. A method according to claim 5, wherein said estimating step includes estimating said gradation information for said pixels in said block corresponding to said number of bits greater than or equal to two by majority decision of other bits for other pixels arranged around said corresponding pixels.

8. A method according to claim 6, wherein said estimating step includes estimating said gradation information for said pixels in said block corresponding to said number of bits greater than or equal to two by majority decision of other bits for other pixels arranged around said corresponding pixels.

* * * * *